(12) United States Patent
Tateishi

(10) Patent No.: US 12,148,442 B2
(45) Date of Patent: Nov. 19, 2024

(54) SIGNAL PROCESSING DEVICE AND SIGNAL PROCESSING METHOD

(71) Applicant: SONY GROUP CORPORATION, Tokyo (JP)

(72) Inventor: Kazuya Tateishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 152 days.

(21) Appl. No.: 17/904,320

(22) PCT Filed: Jan. 18, 2021

(86) PCT No.: PCT/JP2021/001467
§ 371 (c)(1),
(2) Date: Aug. 16, 2022

(87) PCT Pub. No.: WO2021/171829
PCT Pub. Date: Sep. 2, 2021

(65) Prior Publication Data
US 2023/0060081 A1 Feb. 23, 2023

(30) Foreign Application Priority Data
Feb. 26, 2020 (JP) ................. 2020-030136

(51) Int. Cl.
*G10L 21/0232* (2013.01)
*G10L 15/02* (2006.01)
*G10L 15/06* (2013.01)
*G10L 21/0208* (2013.01)
*G10L 25/18* (2013.01)
(Continued)

(52) U.S. Cl.
CPC .......... *G10L 21/0232* (2013.01); *G10L 15/02* (2013.01); *G10L 15/063* (2013.01); *H04R 1/08* (2013.01); *H04R 3/02* (2013.01); *H04R 29/001* (2013.01); *G10L 2021/02082* (2013.01); *G10L 25/18* (2013.01); *G10L 25/30* (2013.01)

(58) Field of Classification Search
None
See application file for complete search history.

(56) References Cited

U.S. PATENT DOCUMENTS

2022/0377181 A1* 11/2022 Chen ..................... H04M 9/082

FOREIGN PATENT DOCUMENTS

| JP | 2004-537219 A | 12/2004 |
|----|---------------|---------|
| JP | 2011-254420 A | 12/2011 |
| JP | 2019-004387 A | 1/2019 |

OTHER PUBLICATIONS

International Search Report and Written Opinion of PCT Application No. PCT/JP2021/001467, issued on Mar. 30, 2021, 08 pages of ISRWO.

* cited by examiner

*Primary Examiner* — Kenny H Truong
(74) *Attorney, Agent, or Firm* — CHIP LAW GROUP

(57) ABSTRACT

There is provided a signal processing device that includes a processing unit configured to collect, through a microphone, a mixed sound signal as a mixed sound of a speaker reproduction signal and a target signal, input a first suppression signal resulting from suppression of the speaker reproduction signal from the mixed sound signal by linear processing, the speaker reproduction signal, and the mixed sound signal collected through the microphone, and output a second suppression signal resulting from further suppression of the speaker reproduction signal from the first suppression signal by non-linear processing.

11 Claims, 12 Drawing Sheets

(51) Int. Cl.
*G10L 25/30* (2013.01)
*H04R 1/08* (2006.01)
*H04R 3/02* (2006.01)
*H04R 29/00* (2006.01)

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2021/001467 filed on Jan. 18, 2021, which claims priority benefit of Japanese Patent Application No. JP 2020-030136 filed in the Japan Patent Office on Feb. 26, 2020. Each of the above-referenced applications is hereby incorporated herein by reference in its entirety.

TECHNICAL FIELD

The present disclosure relates to a signal processing device, a signal processing method, and a program.

BACKGROUND ART

Conventionally, various proposals regarding echo cancellation have been made. For example, Patent Document 1 below describes a technology in which a component incompletely eliminated by double talk due to large reproduction sound volume is suppressed by an attenuation processing unit.

CITATION LIST

Patent Document

Patent Document 1: Japanese Patent Application Laid-Open No. 2019-4387

SUMMARY OF THE INVENTION

Problems to be Solved by the Invention

The technology described in Patent Document 1 has been insufficient as an echo cancellation technology because it is difficult to deal with noise independent from reproduction sound volume, for example, vibration of the housing or distortion of the speaker and causes distortion of the user's utterance.

An object of the present disclosure is to provide a signal processing device, a signal processing method, and a program with improved echo cancellation performance.

Solutions to Problems

According to the present disclosure, provided is, for example,
a signal processing device including:
a processing unit configured to
collect, through a microphone, a mixed sound signal as a mixed sound of a speaker reproduction signal and a target signal,
input a first suppression signal resulting from suppression of the speaker reproduction signal from the mixed sound signal by linear processing, the speaker reproduction signal, and the mixed sound signal collected through the microphone, and
output a second suppression signal resulting from further suppression of the speaker reproduction signal from the first suppression signal by non-linear processing.

According to the present disclosure, provided is, for example,
a signal processing method including:
collecting, through a microphone, a mixed sound signal as a mixed sound of a speaker reproduction signal and a target signal;
inputting a first suppression signal resulting from suppression of the speaker reproduction signal from the mixed sound signal by linear processing, the speaker reproduction signal, and the mixed sound signal collected through the microphone; and
outputting a second suppression signal resulting from further suppression of the speaker reproduction signal from the first suppression signal by non-linear processing.

According to the present disclosure, provided is, for example,
a program for causing a computer to perform a signal processing method including:
collecting, through a microphone, a mixed sound signal as a mixed sound of a speaker reproduction signal and a target signal;
inputting a first suppression signal resulting from suppression of the speaker reproduction signal from the mixed sound signal by linear processing, the speaker reproduction signal, and the mixed sound signal collected through the microphone; and
outputting a second suppression signal resulting from further suppression of the speaker reproduction signal from the first suppression signal by non-linear processing.

MODE FOR CARRYING OUT THE INVENTION

Hereinafter, an embodiment of the present disclosure and others will be described with reference to the drawings. Note that the description will be given in the following order.

EMBODIMENT

Modified Examples

Embodiment

[Basic Concept of Echo Cancellation]

Figure 1:
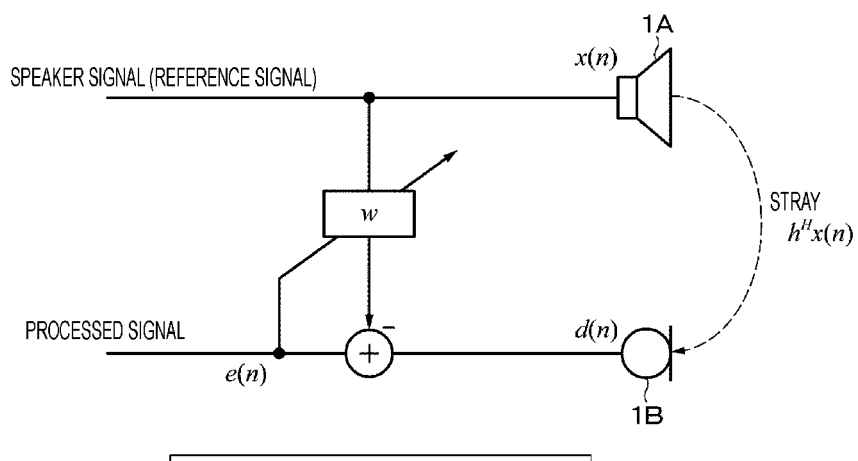
FIG. 1 is an illustration for reference in explanation of a basic concept of echo cancellation processing.

Prior to the description of the present embodiment, a basic concept of echo cancellation processing will be schematically described with reference to FIG. 1. First, an output signal from a speaker 1A in a certain time frame n is indicated as a reference signal $x(n)$. The reference signal $x(n)$ is output from the speaker 1A and then input to a microphone 1B through the space. At this time, a signal obtained through the microphone 1B (collected signal) is indicated as a microphone input signal $d(n)$.

The spatial transfer characteristic h until the output sound from the speaker 1A reaches the microphone 1B is unknown. In the echo cancellation processing, the unknown spatial transfer characteristic h is estimated and the reference signal $x(n)$ considering the estimated spatial transfer characteristic is subtracted from the microphone input signal $d(n)$.

Definition of Terms

The definition of terms used herein is as below.
Echo canceller (acoustic echo canceller (AEC)): a technology of suppressing a speaker reproduction signal that is reproduced from a speaker and strays to a microphone.
Linear echo canceller (linear processing): a technology of subtracting the transmission characteristics of a speaker and a microphone by linear filtering with the most basic AEC. In the real-time processing, a least mean square (LMS) method or the like is used as an adaptive filter.
Non-linear echo canceller (non-linear processing): a technology of suppressing residual echo including noise due to distortion of a speaker or resonance of a housing, a component that cannot be modeled as a spatial transfer path such as clipping, and a component that cannot be eliminated due to, for example, the estimation accuracy of the linear filtering at the preceding stage. Herein, such a non-linear echo canceller is referred to as an echo suppression (acoustic echo suppression (AES)) in contrast to a linear echo canceller. As the content of the algorithm related to the non-linear echo canceller, processing is usually different for each factor of generation of a non-linear component. Note that "cancellation" typically means processing of generating an estimation signal and subtracting the estimation signal from an input signal, whereas "suppression" means a technology of suppressing a level. Herein, "suppression" includes "cancellation".

[Signal Processing Device]

Figure 2:
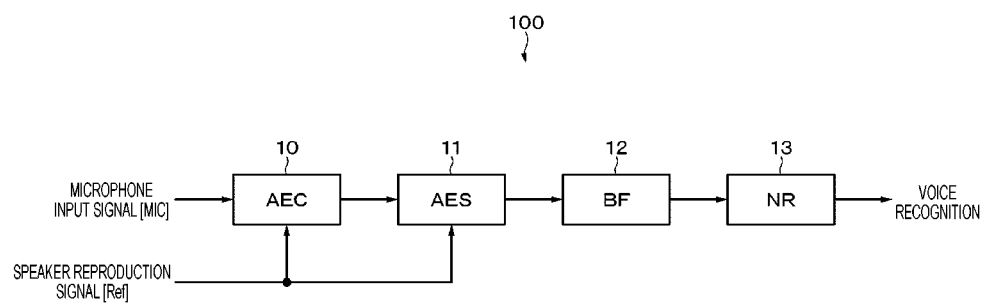
FIG. 2 is a block diagram illustrating an exemplary configuration of a signal processing device according to an embodiment.

FIG. 2 illustrates an exemplary configuration of a signal processing device (signal processing device 100) according to the present embodiment. The signal processing device 100 is mounted on, for example, an electronic apparatus such as a smartphone, a smart speaker, or a robot.

A mixed sound signal (hereinafter, also referred to as a microphone input signal) as a mixed sound of a speaker reproduction signal reproduced from a speaker included in the signal processing device 100 and a predetermined target signal is collected through a microphone included in the signal processing device 100. Echo and others included in the microphone input signal are suppressed (reduced) effectively. The signal with the echo and the others suppressed is subjected to predetermined processing. The predetermined processing is at least one of a piece of beamforming processing, a piece of noise reduction processing, or a piece of voice recognition processing. According to the result of the voice recognition processing, the electronic apparatus to which the signal processing device 100 is applied performs processing according to an application. The component of the speaker reproduction signal propagated through the space is effectively removed from the microphone input signal, resulting in improvement of the accuracy in voice recognition and the call quality.

As illustrated in FIG. 2, the signal processing device 100 includes, for example, an AEC 10 as an exemplary echo-cancellation processing unit, an AES 11 as an exemplary processing unit, a beam forming (BF) 12, and a noise reduction (NR) 13. The AEC 10 is provided at the preceding stage of the AES 11.

The AEC 10 as the exemplary echo-cancellation processing unit applies an LMS method or the like as a linear echo canceller, and subtracts, by linear filtering, the respective transfer coefficients of a speaker and a microphone included in the electronic apparatus. That is, the AEC 10 suppresses a speaker reproduction signal from a microphone input signal by linear processing, and generates and outputs a first suppression signal (hereinafter, appropriately referred to as an Aec signal). The Aec signal is supplied to the AES 11.

The AES 11 suppresses residual echo including noise due to distortion of the speaker or resonance of the housing, a component that cannot be modeled as a spatial transfer path such as clipping, and a component that cannot be eliminated due to, for example, the estimation accuracy of linear filtering by the AEC 10 at the preceding stage. Note that, although the details will be described later, the AES 11 performs machine learning based on a predetermined input to generate a learning model. The AES 11 performs non-linear processing with the generated learning model to generate a second suppression signal (hereinafter, appropriately referred to as an Aes signal) resulting from further suppressing the speaker reproduction signal from the Aec signal.

Note that a deep neural network (hereinafter, appropriately referred to as a DNN) is used as a technique of machine learning by the AES 11, for example. A DNN is a model imitating human cerebral neural circuitry, and is a technique of achieving learning ability possessed by a human on a computer. The DNN is a mechanism in which a large amount of input data prepared in advance is input to a mechanism (multilayer perceptron) that learns by itself, and causes the mechanism to learn automatically the feature amount of the input data within the mechanism. In response to new input of unknown input data to the mechanism, the DNN can determine and classify the output result high in accuracy. Repetition of learning with the DNN derives a learning model that optimizes the prediction output. Note that, as a specific example of the learning model, a parameter or a mask is used herein.

The BF 12 performs beamforming processing. Specifically, for example, in a case where a plurality of microphones is provided, on the basis of difference in sound wave propagation from a sound source to each microphone, the BF 12 performs processing of enhancing or reducing a signal from a specific direction by causing signals whose phases and amplitudes are controlled by a delay and a filter to interfere with each other.

The NR 13 performs noise reduction processing. As the noise reduction processing, known processing is applicable.

Note that a microphone input signal collected through the microphone (not illustrated) and converted into a digital format is input to the AEC 10. Further, a speaker reproduction signal (hereinafter, also referred to as a reference signal (REF) reproduced by the speaker (not illustrated) is input to each of the AEC 10 and the AES 11. Note that the microphone input signal and the speaker reproduction signal may be supplied wiredly or wirelessly.

Figure 3:
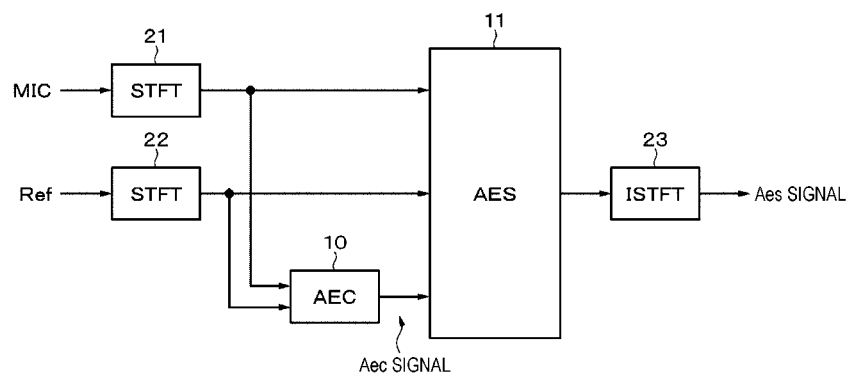
FIG. 3 illustrates the details of a partial configuration of the signal processing device according to the embodiment.

FIG. 3 illustrates the details of a partial configuration of the signal processing device 100. The signal processing device 100 includes a short time Fourier transform (STFT) 21, an STFT 22, and an inverse STFT (ISTFT) 23 in addition to the above configuration.

The STFT 21 divides a microphone input signal into short frames and performs short-time Fourier transform to convert the microphone input signal as a time waveform signal into a frequency domain signal.

The STFT 22 divides a speaker reproduction signal into short frames and performs short-time Fourier transform to convert the microphone input signal as a time waveform signal into a frequency domain signal. The respective audio signals output from the STFT 21 and the STFT 22 are supplied to each of the AEC 10 and the AES 11.

The ISTFT 23 performs short-time Fourier inverse transform on an output signal from the AES 11 to convert the frequency domain signal into a time waveform signal. As a result, an Aes signal as the output signal from the AES 11 is generated.

Figure 4A:
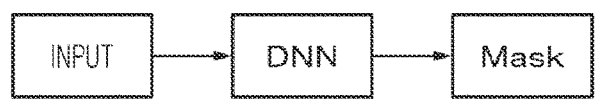
FIGS. 4A and 4B are illustrations for reference in explanation of an exemplary operation of an acoustic echo suppression (AES) according to the embodiment.
Figure 4B:
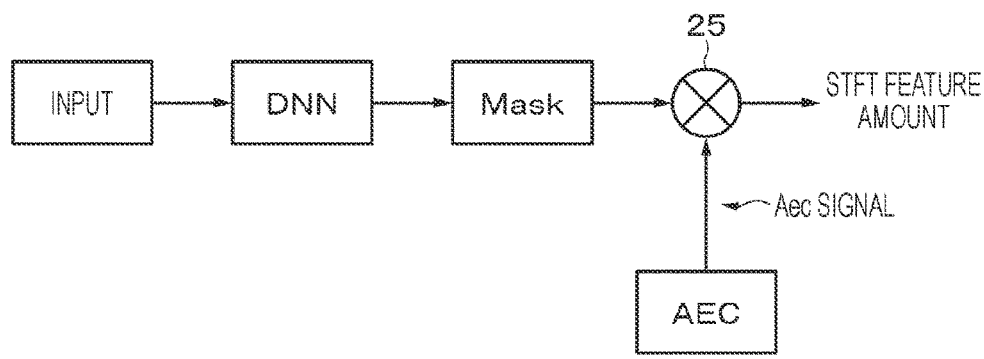

The AES 11 performs time-frequency masking processing on an Aec signal as an output signal from the AEC 10. As illustrated in FIG. 4A, the AES 11 performs learning with a DNN on a predetermined input to obtain a mask (Mask). The mask is, for example, a value set between 0 to 1 corresponding to each time frequency. As illustrated in FIG. 4B, the AES 11 includes, for example, a multiplier 25, and obtains an STFT feature amount by multiplying the Aec signal as the output signal from the AEC 10 by the mask. The ISTFT 23 performs short-time Fourier inverse transform on the STFT feature amount to generate the Aes signal.

Note that, typically, the AES 11 performs learning with a DNN in advance to generate a learning model, and time-frequency masking processing with the learning model applied thereto is performed. However, both may be performed in parallel, that is, while learning with a DNN is performed, time-frequency masking processing to which the learning model obtained as the result of the learning is applied may be performed. Alternatively, an input and an output each can be a time waveform signal without performing short-time Fourier transform or the like, or an output can be a time-frequency spectrogram corresponding to the result of mask processing.

[Learning by AES]

In the present embodiment, the AES 11 performs machine learning (e.g., with a DNN) to learn various nonlinear environments in advance, and then generates a learning model for outputting a suppression signal resulting from suppression of nonlinear components having different causes (such as noise due to distortion of the speaker and noise due to resonance of the housing). Generation of such a learning model enables suppression of an increase in the number of parameters as compared with a technique of preparing the number of parameters corresponding to each factor of the nonlinear components, and enables processing to be performed with a single block without increasing the degree of difficulty in tuning. Further, use of the linear echo canceller (AEC 10 in the present embodiment) at the preceding stage of the AES 11 enables suppression of echo components to some extent while utterance distortion is suppressed. As a result, a component of the target utterer can be extracted with low delay and low calculation resources without providing a large model size.

First Example

Figure 5:
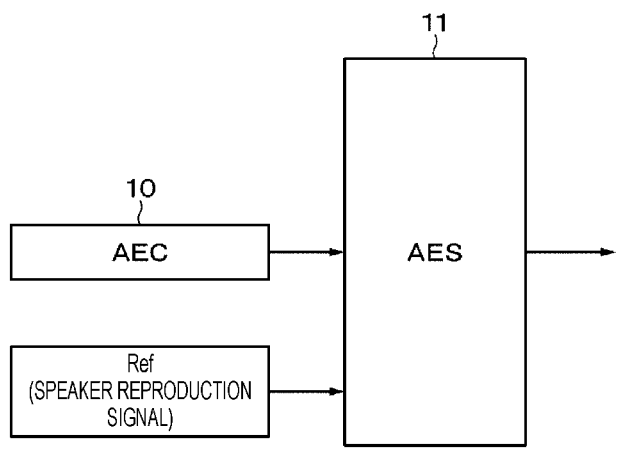
FIG. 5 explanatorily illustrates a first example regarding input in learning with a DNN by the AES according to the embodiment.

Hereinafter, a plurality of examples regarding input in learning with a DNN by the AES 11 will be described. FIG. 5 explanatorily illustrates a first example regarding input in leaning with a DNN by the AES 11. In the first example, the AES 11 creates a model resulting from learning in advance an incompletely eliminated signal due to many nonlinear components on the basis of information regarding an Aec signal as an output signal from the AEC 10 and a speaker reproduction signal (Ref signal). Specifically, learning for suppressing the speaker reproduction signal is repeated such that the Aec signal becomes correct data. As a result, parameter is obtained. Due to application of such a parameter, the AES 11 operates so as to suppress an echo component in response to input of an unknown signal to the signal processing device 100.

Second Example

Figure 6:
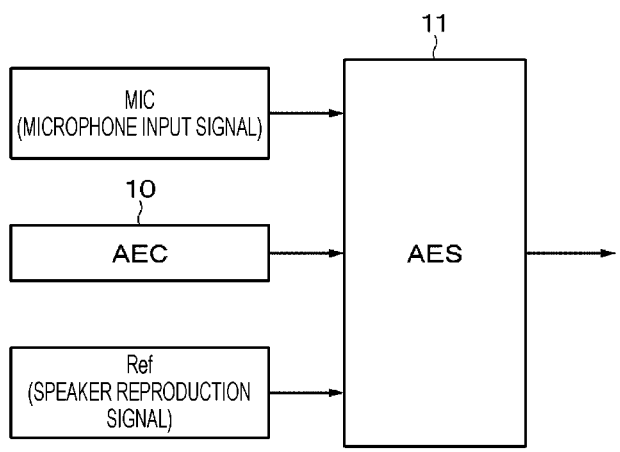
FIG. 6 explanatorily illustrates a second example regarding input in learning with a DNN by the AES according to the embodiment.

In the input according to the first example, it is unknown how much the main echo component has been eliminated by the AEC 10. Even if the speaker reproduction signal as a reference signal is given, the scale of a clean signal and that of a signal having passed through the space once do not match. Thus, there is a possibility that the suppression performance is deteriorated. Therefore, in the present example, as illustrated in FIG. 6, a microphone input signal before suppression is added to an input together with an Aec signal. As a result, it is clear how much a linear component has been eliminated for each time period, which facilitates determination of how much the component of the speaker reproduction signal should be suppressed from the remaining signal, so that the prediction performance in scale can be improved.

Third Example

Figure 7:
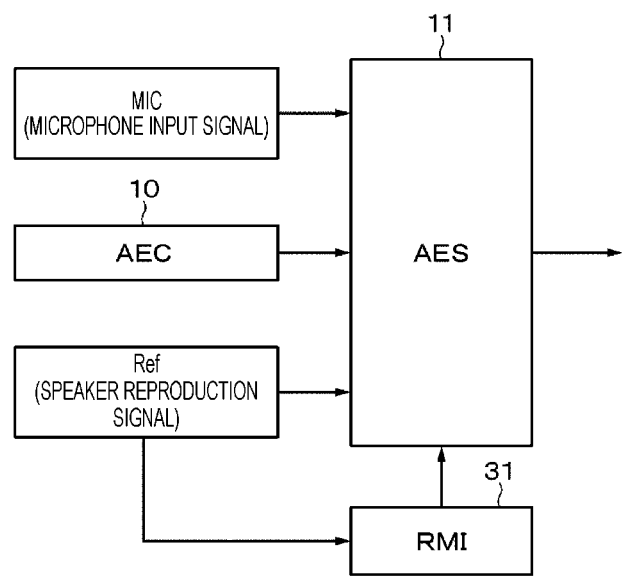
FIG. 7 explanatorily illustrates a third example regarding input in learning with a DNN by the AES according to the embodiment.

In the present example, a model of a specific utterer likeness such as text to speech (TTS) is preliminary learned and used as an auxiliary input. For example, in a case where, separately from learning by the AES 11, a kind of character is implemented on the apparatus itself and it is known in advance what kind of voice (e.g., speech, details, or sound volume) is reproduced from the speaker, a reference model information (RMI) unit 31 models a feature of an utterance of the character (hereinafter, abbreviated as a feature as appropriate) by preliminary learning as illustrated in FIG. 7. Application of such a learning model to a speaker reproduction signal together with the learning model generated by the AES 11 results in improvement of the determination accuracy for a signal to be suppressed. More specifically, only a component of the voice of a specific character can be extracted and suppressed while suppressing nonlinear components having different causes.

Figure 8:
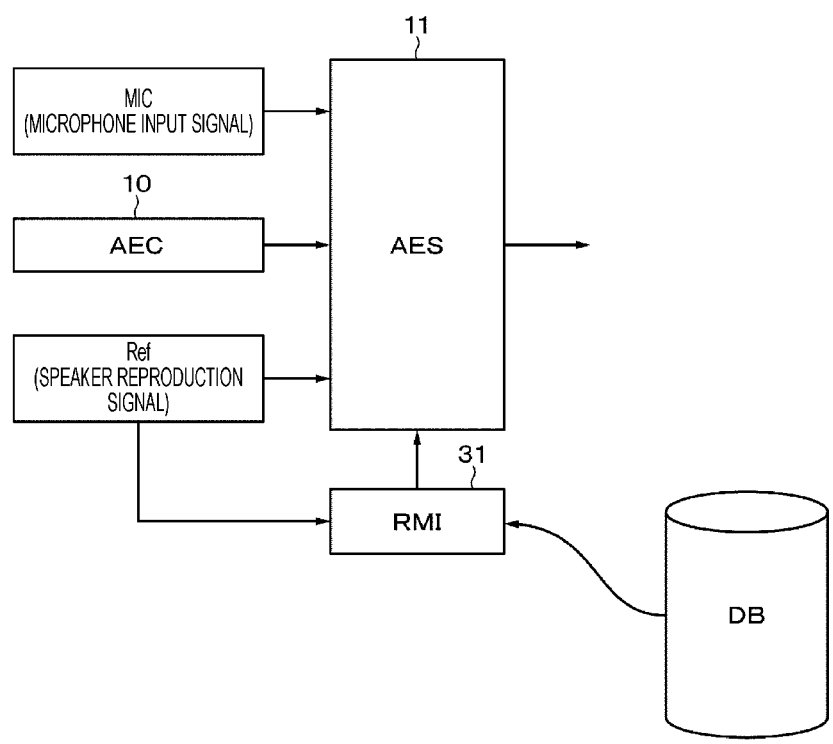
FIG. 8 explanatorily illustrates the third example regarding the input in learning with the DNN by the AES according to the embodiment.

A third example will be described specifically. As illustrated in FIG. 8, a predetermined feature of a character is supplied from a database (DB) to the RMI unit 31. The feature of a character is information that can be distinguished from the features of other characters. Examples of the feature of the character include the identification (ID) of the character, the speech of the character, the gender of the character, the frequency characteristic of the voice of the character, the feeling of the character, the speech speed of the character, the sound volume of the character, and the like. These features are held as, for example, numeric vectors such that the RMI unit 31 can learn them. Note that a database may be built in the electronic apparatus including the signal processing device 100, or may be a server device or the like on a cloud. In the latter case, the features of the character are supplied to the RMI unit 31 of the signal processing device 100 through a network such as the Internet.

Figure 9:
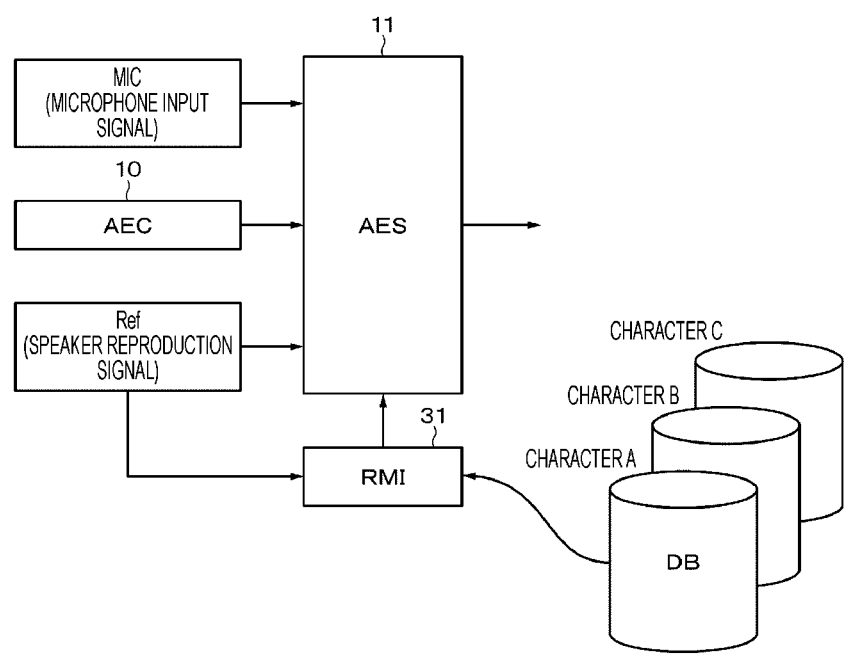
FIG. 9 explanatorily illustrates the third example regarding the input in learning with the DNN by the AES according to the embodiment.

More specifically, as illustrated in FIG. 9, a feature for each character is input to the RMI unit 31. As a specific example, the respective features of characters A, B, and C are input to the RMI unit 31. For example, the RMI unit 31 performs learning with clean TTS data of each character and TTS data having passed though the space after reproduction of the TTS data from the speaker in various environments as inputs, thereby generating, for each character, a learning model for extracting an utterance of the character.

Figure 10:
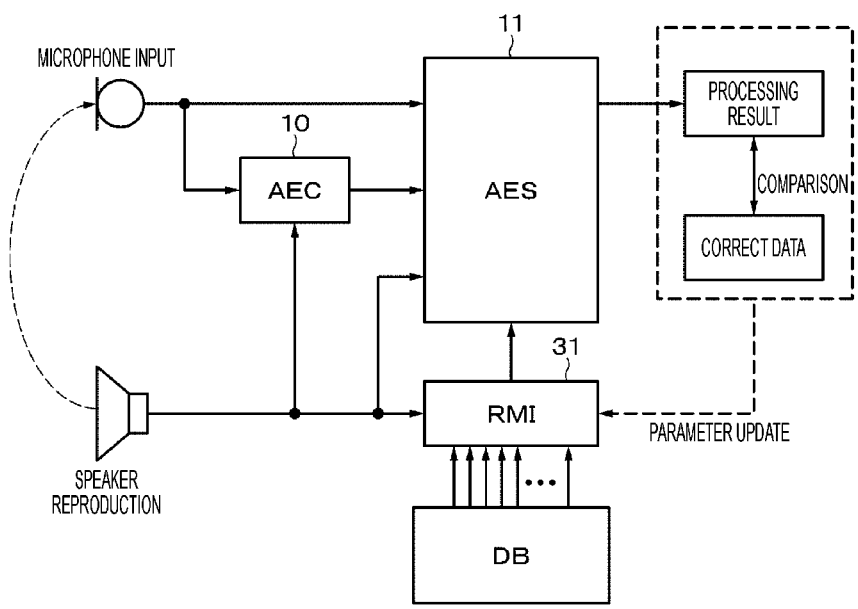
FIG. 10 explanatorily illustrates an exemplary learning method by a reference model information (RMI) unit with reference to a database.

FIG. 10 explanatorily illustrates an exemplary learning method by the RMI unit 31 with reference to such a database as described above. A large number of input signals including data of each database (feature for each character) and the spatial transfer characteristic of the corresponding reproduction signal, the distortion of the speaker, and others are input to the RMI unit 31. The RMI unit 31 learns such that the output result is close to correct data (a component of the voice of a character corresponding to the database with echo suppressed). Note that, in learning by the RMI unit 31, a parameter may be updated by the AES 11 simultaneously learning (multi-task learning) as in the first example or the second example, or a parameter of the AES 11 may be fixed and only a parameter of the RMI unit 31 may be updated. A parameter obtained as the result of learning is applied to, for example, an Aes signal.

Figure 11:
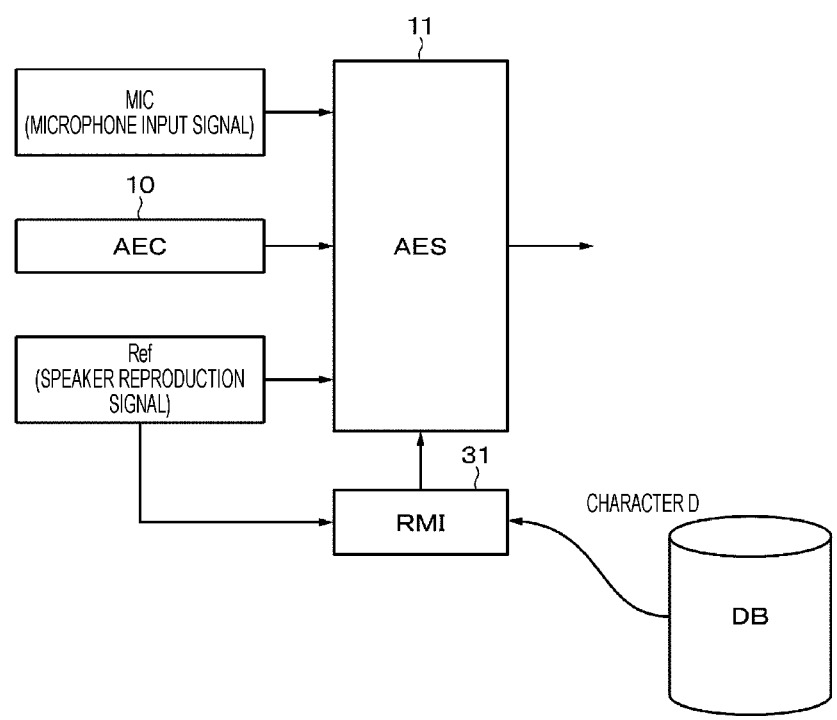
FIG. 11 explanatorily illustrates the third example regarding the input in learning with the DNN by the AES according to the embodiment.

Note that the learning may be performed on the database side, and in this case, a learning model corresponding to a specific character may be supplied to and used by the RMI unit 31 or the AES 11. Further, in this case, as illustrated in FIG. 11, in a case where a new character (e.g., character D) is added, addition of a learned database corresponding to the character D enables the character D to be dealt with. The learned database corresponding to the character D can be added by using an external memory or by providing learned data to the signal processing device 100 through a network. In such a manner, a character to be newly added can be dealt with, without changing the configuration according to the AES 11. Alternatively, a feature corresponding to the character D may only be input to the RMI unit 31. For example, in a case where the RMI unit 31 sufficiently repeats learning with the features of other characters, only input of a feature of a new character enables the RMI unit 31 to generate a parameter corresponding to the character and supply the parameter to the AES 11.

Figure 12:
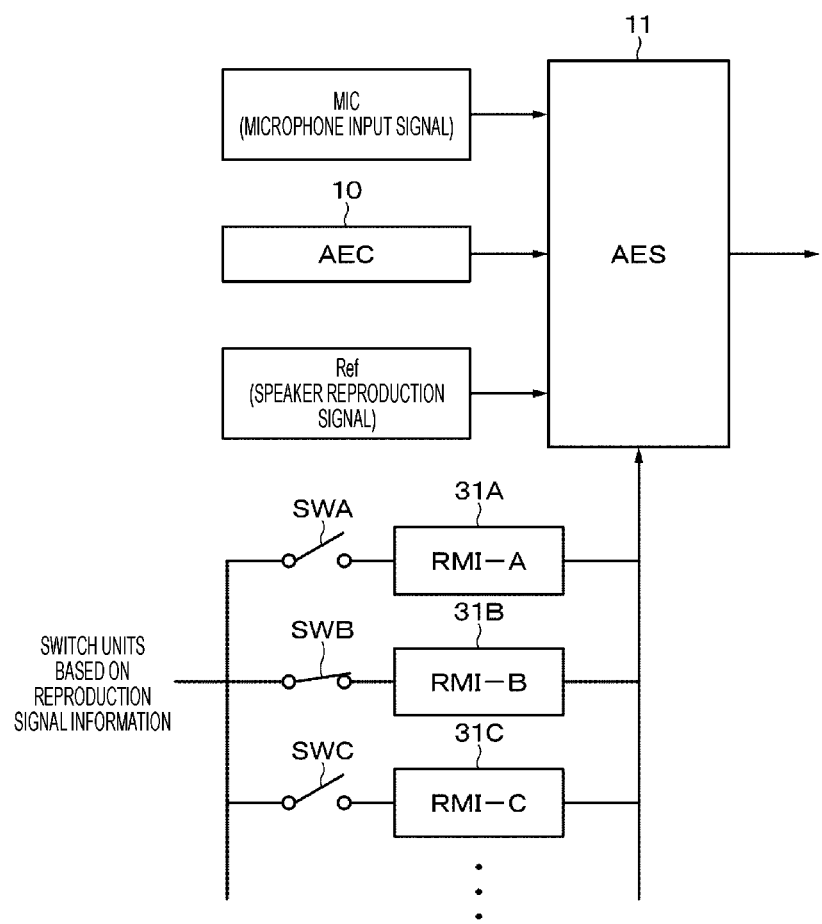
FIG. 12 explanatorily illustrates the third example regarding the input in learning with the DNN by the AES according to the embodiment.

Alternatively, output from the common RMI unit 31 may be changed by changing a database, but this is not limiting. For example, as illustrated in FIG. 12, an RMI unit 31A, an RMI unit 31B, an RMI unit 31C, and . . . are provided as RMI units corresponding to the character A, the character B, the character C, and . . . , respectively. In the present example, each RMI unit 31 is a model including the features of the corresponding database and holds a parameter obtained by learning. Each switch unit (switch unit SWA, switch unit SWB, switch unit SWC, or . . . ) is provided at the preceding stage of the corresponding RMI unit. A switch unit corresponding to a character whose voice is desired to be extracted is selected and turned on, and the other switch units are turned off. On/off of each switch unit is controlled on the basis of reproduction signal information. The reproduction signal information may be generated in response to an operation to the signal processing device 100, may be automatically generated inside the signal processing device 100, or may be externally supplied from the signal processing device 100. According to the example, making a switch between the switch units enables real-time switching of the target character.

Fourth Example

Figure 13:
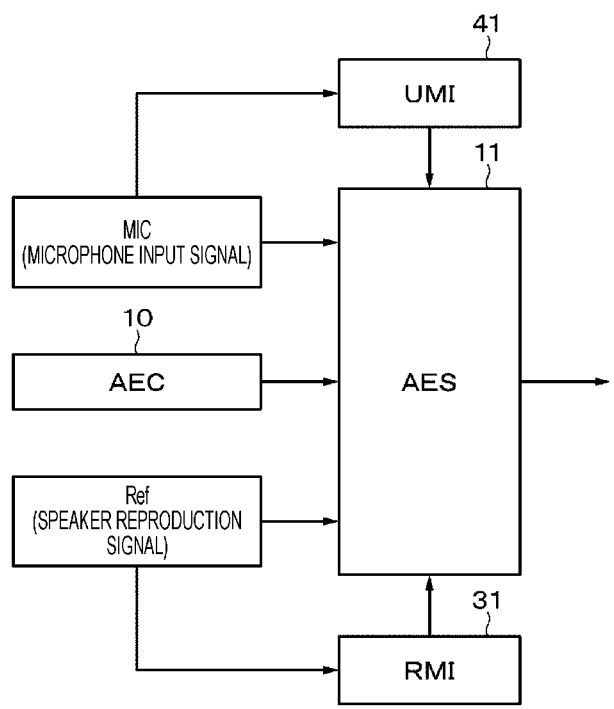
FIG. 13 explanatorily illustrates a fourth example regarding input in learning with a DNN by the AES according to the embodiment.

In the present example, a feature of a near-end utterer (user) is preliminary learned in advance as a model and used as an auxiliary input. Specifically, as illustrated in FIG. 13, separately from learning by the AES 11, a user model information (UMI) unit 41 preliminary learns the voice of the near-end utterer (user) such as the speech or the sound volume, a reverberation component generated by passing through the space, and others, thereby obtaining a parameter. Processing with the parameter is performed by the AES 11. More specifically, the UMI unit 41 learns the spectrum of a section (utterance section) in which no speaker reproduction signal is present and a person is speaking. The use of the parameter obtained by the learning enables an utterance section to be detected high in accuracy. Processing with a parameter supplied from the RMI unit 31 is performed on the utterance section. Note that the preliminary learning by the parameter UMI unit 41 can be performed not at the signal processing device 100 but at another terminal such as a smartphone.

Effects Obtained by Present Embodiment

According to the present embodiment described above, the following effects can be obtained.

In the case of individual treatment with the noise of a nonlinear component, the number of parameters for performing each processing increases, and the degree of difficulty in tuning also increases. However, according to the present embodiment, data of a plurality of nonlinear factors is collected and learned in advance, so that processing can be performed with a single block without treating individually.

The use of the AEC 10 at the preceding stage of the AES 11 enables suppression of echo components to some extent while suppressing utterance distortion. As a result, a component of the target utterer can be extracted efficiently with low delay and low calculation resources without providing a large model size in machine learning.

The techniques of machine learning include a technique of improving performance by utilizing future information. Echo canceller processing, however, is normally used at a preceding stage in signal processing in many cases, so that it is required to reduce a system delay as much as possible. According to the present embodiment, no future information is used and the latest frame information of the output of the linear echo canceller is used as an input. Thus, processing without delay can be performed in principle.

MODIFIED EXAMPLES

The plurality of embodiments of the present disclosure has been described specifically. The present disclosure, however, is not limited to the above embodiments, and thus various modifications based on the technical idea of the present disclosure can be made.

The signal processing device 100 may include a single speaker and a single microphone, or may be a plurality of speakers and a plurality of microphones. The configuration of the signal processing device 100 can be appropriately changed according to the configuration of an apparatus to which the signal processing device 100 is applied, without departing from the gist of the present disclosure.

The configurations, methods, processes, shapes, materials, numeric values, and others described in the above embodiments and the modified examples thereof are merely examples, and configurations, methods, processes, shapes, materials, numeric values, and others different from those described in the above embodiments and the modified examples thereof may be used as necessary or may be replaced with known ones. Further, the configurations, methods, processes, shapes, materials, numeric values, and the others of the above embodiments and modifications thereof can be combined with each other within a range in which no technical contradiction occurs.

Note that the details of the present disclosure are not to be construed as being limited by the effects exemplified in the present specification.

The present disclosure can also adopt the following configurations.

(1)

A signal processing device including:

a processing unit configured to collect, through a microphone, a mixed sound signal as a mixed sound of a speaker reproduction signal and a target signal, input a first suppression signal resulting from suppression of the speaker reproduction signal from the mixed sound signal by linear processing, the speaker reproduction signal, and the mixed sound signal collected through the microphone, and output a second suppression signal resulting from further suppression of the speaker reproduction signal from the first suppression signal by non-linear processing.

(2)

The signal processing device according to (1), in which the processing unit generates the second suppression signal by the non-linear processing with a learning model obtained by machine learning.

(3)

The signal processing device according to (1) or (2), further including:

an echo-cancellation processing unit configured to generate the first suppression signal from the mixed sound signal.

(4)

The signal processing device according to (3), in which the echo-cancellation processing unit is provided at a preceding stage of the processing unit.

(5)

The signal processing device according to any of (1) to (4), in which a learning model obtained by learning a feature of an utterance corresponding to a predetermined utterer is applied to the second suppression signal.

(6)

The signal processing device according to (5), in which the learning model obtained by learning the feature of the utterance corresponding to the predetermined utterer is applied to a signal of an utterance section extracted due to application of a learning model obtained by learning the utterance section.

(7)

The signal processing device according to any of (1) to (6), in which predetermined processing is performed on the output from the processing unit.

(8)

The signal processing device according to (7), in which the predetermined processing includes at least one of a piece of beamforming processing, a piece of noise reduction processing, or a piece of voice recognition processing.

(9)

The signal processing device according to any of (1) to (8), further including:

the microphone; and a speaker configured to reproduce the speaker reproduction signal.

(10)

A signal processing method including:

collecting, through a microphone, a mixed sound signal as a mixed sound of a speaker reproduction signal and a target signal;

inputting a first suppression signal resulting from suppression of the speaker reproduction signal from the mixed sound signal by linear processing, the speaker reproduction signal, and the mixed sound signal collected through the microphone; and outputting a second suppression signal resulting from further suppression of the speaker reproduction signal from the first suppression signal by non-linear processing.

(11)

A program for causing a computer to perform a signal processing method including:

collecting, through a microphone, a mixed sound signal as a mixed sound of a speaker reproduction signal and a target signal;

inputting a first suppression signal resulting from suppression of the speaker reproduction signal from the mixed sound signal by linear processing, the speaker reproduction signal, and the mixed sound signal collected through the microphone; and outputting a second suppression signal resulting from further suppression of the speaker reproduction signal from the first suppression signal by non-linear processing.

REFERENCE SIGNS LIST

10 AEC
11 AES
31 RMI unit
41 UMI unit
100 Signal processing device
DB Database

The invention claimed is:

1. A signal processing device, comprising:
a processing unit configured to:
collect, through a microphone, a mixed sound signal from a mixed sound of a speaker reproduction signal and a target signal,
input a first suppression signal based on a result of suppression of the speaker reproduction signal from the mixed sound signal, wherein
the suppression of the speaker reproduction signal from the mixed sound signal is based on a linear processing on the mixed sound signal, and
the first suppression signal includes a plurality of non-linear components of the speaker reproduction signal, and
output a second suppression signal based on a result of suppression of the plurality of non-linear components of the speaker reproduction signal from the first suppression signal, wherein the suppression of the plurality of non-linear components is based on a non-linear processing of the first suppression signal.

2. The signal processing device according to claim 1, wherein the processing unit is further configured to generate the second suppression signal by the non-linear processing with a learning model from machine learning.

3. The signal processing device according to claim 1, further comprising:
an echo-cancellation processing unit configured to generate the first suppression signal from the mixed sound signal.

4. The signal processing device according to claim 3, wherein the echo-cancellation processing unit is at a preceding stage of the processing unit.

5. The signal processing device according to claim 1, wherein
the processing unit if further configured to apply a learning model on the second suppression signal, and
the second suppression signal is based on a learning of a feature of an utterance corresponding to a specific utterer.

6. The signal processing device according to claim 5, wherein
the processing unit is further configured to apply the learning model to a signal of an utterance section,
the utterance section is extracted based on an application of a specific learning model, and
the specific learning model is based on a learning of the utterance section.

7. The signal processing device according to claim 1, wherein a specific processing is performed on the second suppression signal.

8. The signal processing device according to claim 7, wherein the specific processing includes at least one of a piece of beamforming processing, a piece of noise reduction processing, or a piece of voice recognition processing.

9. The signal processing device according to claim 1, further comprising:
the microphone; and
a speaker configured to reproduce the speaker reproduction signal.

10. A signal processing method, comprising:
collecting, through a microphone, a mixed sound signal from a mixed sound of a speaker reproduction signal and a target signal;
inputting a first suppression signal based on a result of suppression of the speaker reproduction signal from the mixed sound signal, wherein
the suppression of the speaker reproduction signal from the mixed sound signal is based on a linear processing on the mixed sound signal, and
the first suppression signal includes a plurality of non-linear components of the speaker reproduction signal; and
outputting a second suppression signal based on a result of suppression of the plurality of non-linear components of the speaker reproduction signal from the first suppression signal, wherein the suppression of the plurality of non-linear components is based on a non-linear processing of the first suppression signal.

11. A non-transitory computer-readable medium having stored thereon, computer-executable instructions which, when executed by a computer, cause the computer to execute operations, the operations comprising:
collecting, through a microphone, a mixed sound signal from a mixed sound of a speaker reproduction signal and a target signal;
inputting a first suppression signal based on a result of suppression of the speaker reproduction signal from the mixed sound signal, wherein
the suppression of the speaker reproduction signal from the mixed sound signal is based on a linear processing on the mixed sound signal, and
the first suppression signal includes a plurality of non-linear components of the speaker reproduction signal; and
outputting a second suppression signal based on a result of suppression of the plurality of non-linear components of the speaker reproduction signal from the first suppression signal, wherein the suppression of the plurality of non-linear components is based on a non-linear processing of the first suppression signal.

* * * * *